March 11, 1969
R. C. HOLMSTROM
3,432,207
WHEEL AND METHOD OF MANUFACTURING THE SAME
Filed Jan. 25, 1967
Sheet 1 of 2
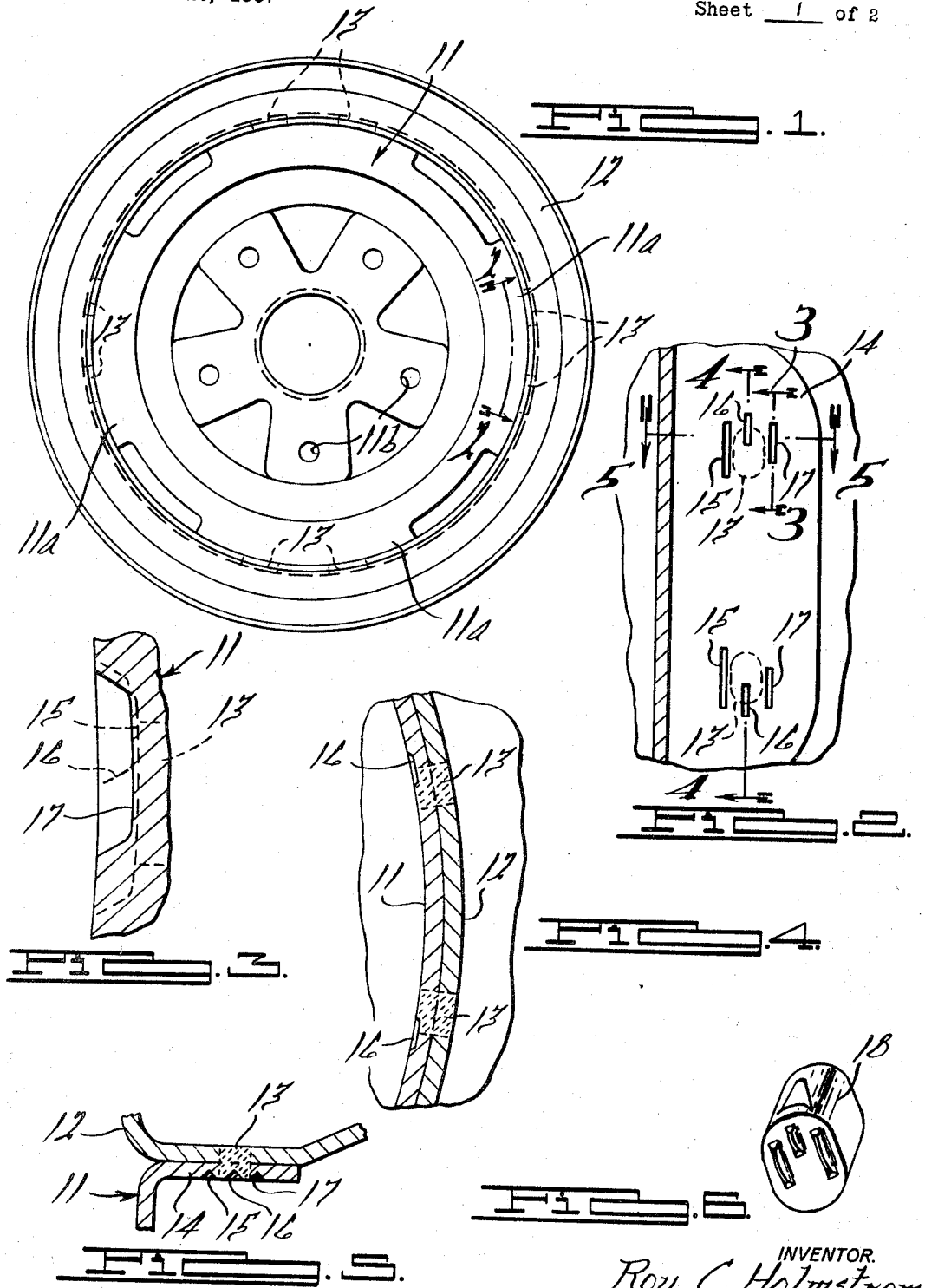
INVENTOR.
Roy C. Holmstrom
BY
Harness, Dickey & Pierce
ATTORNEYS.

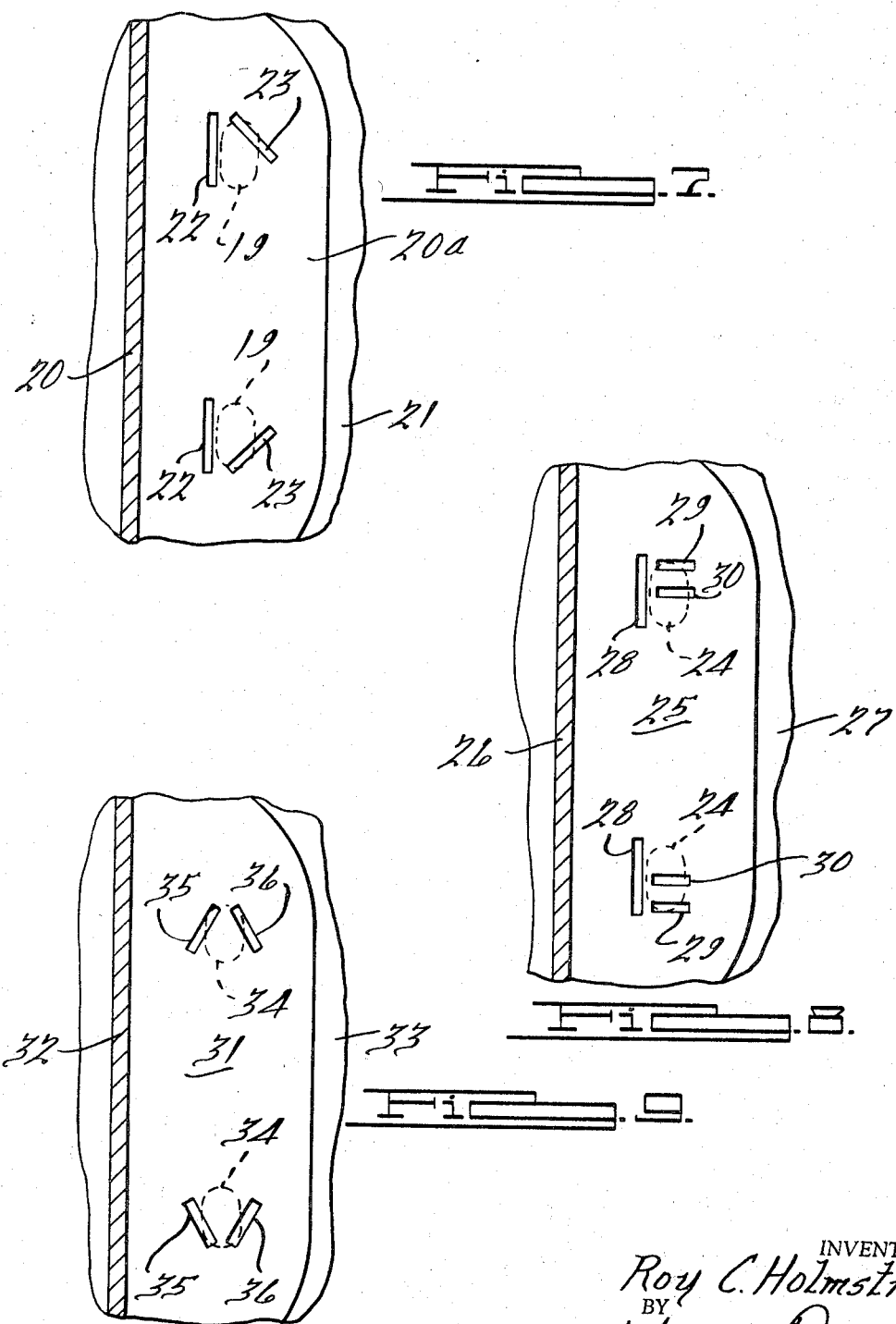

United States Patent Office

3,432,207
Patented Mar. 11, 1969

3,432,207
WHEEL AND METHOD OF MANUFACTURING THE SAME
Roy C. Holmstrom, Dearborn, Mich., assignor to Kelsey-Hayes Company, Romulus, Mich., a corporation of Delaware
Filed Jan. 25, 1967, Ser. No. 611,635
U.S. Cl. 301—63          6 Claims
Int. Cl. B60b 1/06; B21h 1/02; B21k 1/32

ABSTRACT OF THE DISCLOSURE

A wheel having a rim spot-welded to a steel wheel body wherein the "spot" welded areas are indented to relieve the stresses created therein during the cooling of the welded metal. The indentations are rectilinear and are disposed in selected locations along one edge of the weld. By this means the welds are more able to withstand the stresses resulting from the flexure of the wheel body relative to the rim.

---

This invention relates to vehicle wheels and particularly to a vehicle wheel having a wheel body with a flange around the periphery thereof which conformably engages a wheel rim and is secured thereto by spaced spot welds.

Upon completion of the spot-welding process, wherein two pieces of metal are permanently joined by the application of welding electrodes at intervals upon the area of juncture, the welded areas undergo a rapid cooling from the very high welding temperatures as the welding heat is absorbed by the surrounding metal. It is generally accepted in the art that the rapid cooling described above develops radial tension stresses of fairly high values in the spot welds and the surrounding metal due to the thermal contraction of the metal at the spot welds and that said stresses are the probable cause of the low fatigue resistance of spot welds under cyclic loads. This phenomenon has particular relevance to the manufacture of vehicle wheels by means of spot welding because of the cyclic loads to which said wheels are subjected when in use.

Accordingly, it is an object of the present invention to provide a vehicle wheel of spot-welded construction having a high fatigue resistance under the cyclic loads of vehicular movement.

It is another object of the present invention to improve said fatigue resistance by providing a method for treating the spot weld so as to reduce the stressed condition thereof.

These and other objects of the present invention will become apparent from the following detailed description taken in conjunction with the accompanying drawings wherein:

FIGURE 1 is a side elevational view of a vehicle wheel embodying features of the present invention;

FIG. 2 is an enlarged sectional view of the structure illustrated in FIG. 1, taken along the line 2—2 thereof;

FIG. 3 is an enlarged sectional view of the structure illustrated in FIG. 2, taken along the line 3—3 thereof;

FIG. 4 is a sectional view of the structure illustrated in FIG. 2, taken along the line 4—4 thereof;

FIG. 5 is a sectional view of the structure illustrated in FIG. 2, taken along the line 5—5 thereof;

FIG. 6 is a perspective view of a coining die used in forming the structure illustrated in FIGS. 1 through 5; and FIGS. 7, 8, and 9 are views of the structure similarly illustrated in FIG. 2 showing three modifications of the structure of the present invention.

Referring now to the drawings, a vehicle wheel construction is shown having a generally planar radially oriented wheel body 11 conformably engaged with a wheel rim 12 and secured thereto by spot welds 13 spaced along the area of engagement. The inner periphery of a flange 14 of the wheel body 11 is impressed or coined with parallel indentations 15, 16 and 17 disposed closely adjacent to and on each spot weld 13. The indentations 15, 16 and 17 are all elongated in a circumferential direction and are of generally wedge shaped cross section. That is to say, the indentations diminish in width as they become deeper. The indentations 15, 16 and 17 are coined on the inside of the wheel body flange 14 after the spot welding process by means of a hardened steel coining die 18. The coining treatment compresses the metal contacted and laterally displaces the metal so that the radial tension stresses resulting from the rapid cooling of the completed spot weld are relieved. The cyclic load resistance of the counteracting internal compression and tension stresses in and around a treated spot weld has been shown to be several hundred percent higher than the inherently low resistance of internal tension stresses in an untreated spot weld.

The wheel body 11 will be seen to have four arms 11a so that the flange 14 is actually discontinuous or interrupted. The portion of the flange 14 at one arm 11a is separated from the portions of the flange 14 at the other arms 11a. It will be seen that the spot welds 13 are arranged in pairs—one pair for each arm 11a. It will also be seen that the welds 13 are of oval shape with the major axis of the oval being oriented in a circumferential direction.

An important factor governing the attainment of the best fatigue resistance in spot welds is the arrangement of the identations in and around each spot weld nugget. For the wheel construction herein illustrated, the indentation 15 is located at the side of the weld adjacent the wheel body 11 which is subject to the greatest stresses due to deflection of the wheel body 11 relative to the rim 12. For this reason, the indentation 15 is longer than indentations 16 and 17 so as to provide the greatest compression where it is needed most. The position of the indentation 15 may vary approximately .125 inch in either direction (axially of the wheel) from the side of the spot weld adjacent the main radial portion of the wheel body 11.

As best seen in FIG. 2, the indentations 16 are located at outer sides of each pair of spot welds 13. The indentations 16 are located to provide stress relief where they will do the most good. While an indentation completely encircling the weld might theoretically provide greater stress relief, the indentations illustrated herein provide all the stress relief that is needed and they permit a reasonable degree of misregistration between the indentor die and the weld. In contrast, a circular indentation must be very accurately located if it is to be effective. The coining die 18 is also relatively inexpensive and it may be used on a small press or the like and requires less effort to apply than a die making a circular indentation. Accordingly, for the wheel construction of the present invention, two allochiral coining dies 18 are employed to provide right and left handed indentation patterns as illustrated. The indentations 15, 16 and 17 are of the same general depth. The slight variation in indentation depth shown in FIG. 3 is a result of die configuration to compensate for machine deflection and is within the desired tolerances.

It will be seen that the arrangement of the indentations 15, 16, and 17 leaves the facing or adjacent edges of the spot welds 13 of each pair unindented. This is acceptable because such edges are not subject to very great fatiguing. Each weld 13 protects the adjacent side of its paired weld. For this reason the construction of the present invention may be said to employ selective stress relief indentation, with the process employed being ideally suited to low cost high volume production.

The present invention is characterized by flexibility in still other aspects. In the coining process of the present invention, coining may be applied to both the wheel rim 12 and the flange 14 of the wheel body 11 or to the rim 12 alone. Also, even one indentation properly positioned in relation to a spot weld has been shown to provide sufficient compression to relieve much of the tension stresses resulting from the welding process. Thus, for determining effectiveness of stress relief, the positioning of the indentations is at least as influential as the number of indentations used. In the wheel construction of the present invention, sufficient stress relief can be achieved by a single indentation having a length equal to or greater than the length of its respective spot weld and positioned at or adjacent to the edge of its spot weld nearest the corner between the body 11 and the body flange 14. The desired stress relief will be realized when the single indentation is located within a distance equal to one-third of the axial width of the spot weld width from the edge of the spot weld adjacent the wheel body 11. The indentations 15 shown in FIGS. 2 and 5 are representative of the dimensions and positioning of single indentations as discussed above. In one embodiment of the invention the spot welds 13 had an axial width of .40 inch and the distance between the centers of the indentations 15 and 17 was .50 inch.

It will be seen that the wheel body 11 has bolt holes 11b by which the wheel is mounted to an axle, hub or the like. The wheel is subject to dynamic loading as the result of the deflection of the rim 12 relative to the wheel body 11. It is such relative movement that can cause a weld 13 to fail in the absence of the proper coining of the welds as described herein.

The coining process performs an additional function in the present invention. The spot welds 13 become like cast steel in the structure and the "working" of the cast steel at the points coined serves to improve the metallurgical character of the metal in those areas to correspond with forged steel.

FIGURE 7 illustrates a modification of the present invention in which spot welds 19 serve to join the flange 20a of a wheel body 20 to a rim 21. The spot welds 19 are arranged in pairs similar to the first embodiment of FIGS. 1 through 5. An elongated circumferentially extending indentation 22 is formed in the flange 20a along the side of each weld 19 adjacent the main radially extending portion of the wheel body 20. Each indentation 22 is of a circumferential length approximately equal to that of the weld 19 and is circumferentially coextensive with its adjacent weld 19. The position of the indentation 22 may vary .125 inch in either direction from the axially inner side of its adjacent spot weld 19.

Each spot weld 19 has a second elongated indentation 23 extending diagonally across the axially and circumferentially outer corner thereof. This is the corner on the side of the spot weld adjacent the terminal edge of the flange 20a and the circumferential side of the spot weld opposite from the other spot weld 19 with which it is paired. The indentation 23 is preferably formed on the flange 20a. The function of the indentation 23 is similar to the function described for the indentation 15 while the indentation 23 functions in a manner similar to the indentations 16 and 17 of the first described embodiment of the invention.

FIG. 8 illustrates another embodiment of the present invention in which spot welds 24 serve to join the flange 25 of a radially extending wheel body 26 to a rim 27. Spot welds 24 are arranged in pairs similar to the prior embodiments of the invention and a circumferentially elongated indentation 28 is formed in each flange 25 along the axially inner edge of each spot weld 24. A pair of axially extending indentations 29 and 30 are formed in each spot weld at right angles to the indentation 28. The indentation 29 is disposed along the circumferentially outer side of the spot weld 24 whereas the indentation 30 is disposed at the center of the spot weld 24.

FIG. 9 illustrates another form of the present invention in which the flange 31 of the radially extending wheel body 32 is joined to a rim 33 by means of pairs of spot welds 34. The flange 31 is provided with pairs of indentations 34 and 36 which extend diagonally across each end spot weld 34. The indentation 35 extends across the circumferentially outer and axially inner corner of the spot weld, whereas the indentation 36 extends diagonally across the axially and circumferentially outer corner of the spot weld 34.

It will be noted that the indentations of each of the embodiments illustrated herein are rectilinear as viewed in one plane and, accordingly, the indenter dies for forming such indentations may be readily machined.

While it will be apparent that the preferred embodiments herein illustrated are well calculated to fulfill the objects above stated, it will be appreciated that the invention is subject to modification, variation and change without departing from the proper scope or fair meaning of the subjoined claims.

What is claimed is:
1. A vehicle wheel embodying a radially extending body portion provided with mounting means, a circumferential flange portion, and a rim engageable with said flange portion and secured thereto by spot welds, at least one of said portions having on an exposed surface thereof at least one circumferentially extending rectilinear indentation disposed along the side of said spot welds adjacent said body.
2. A vehicle wheel as recited in claim 1, wherein said indentation is disposed adjacent to each of said spot welds.
3. A vehicle wheel as recited in claim 1 wherein said indentation is spaced from said side a distance no greater than one-third of the axial width of the spot weld with which it is associated.
4. A vehicle wheel as recited in claim 1, wherein additional indentations parallel to said at least one indentation are formed in one of said portions adjacent the same spot weld as said at least one spot weld.
5. A vehicle wheel as recited in claim 2 wherein said flange portion is interrupted, each part of the rim portion between interruptions is joined to the rim by a pair of spot welds and each spot weld has an additional circumferentially extending rectilinear indentation which passes through the side thereof away from its paired spot weld but does not pass through the side thereof adjacent its paired spot weld.
6. The method of making a vehicle wheel having a radial body provided with a circumferential flange portion and a rim portion engageable with said flange portion including the steps of resistance spot welding said portions together permitting the welds to at least partially cool and thereafter indenting one of said portions along a straight circumferentially elongated line disposed adjacent the side of one of said welds adjacent to the body.

References Cited

UNITED STATES PATENTS

| 1,711,628 | 5/1929 | Williams | 219—91 X |
| 2,818,303 | 12/1957 | Main | 301—63 |
| 2,830,168 | 4/1958 | Taylor | 29—159.01 X |
| 2,840,422 | 6/1958 | Main | 301—63 |
| 3,117,369 | 1/1964 | Albert | 301—63 X |

OTHER REFERENCES

Kron prinz—German printed application; October 1961.

RICHARD J. JOHNSON, Primary Examiner.

U.S. Cl. X.R.

29—159.01; 219—128